March 2, 1965        M. C. JAHN        3,171,315
PIE CRUST MARKER
Original Filed Aug. 3, 1959
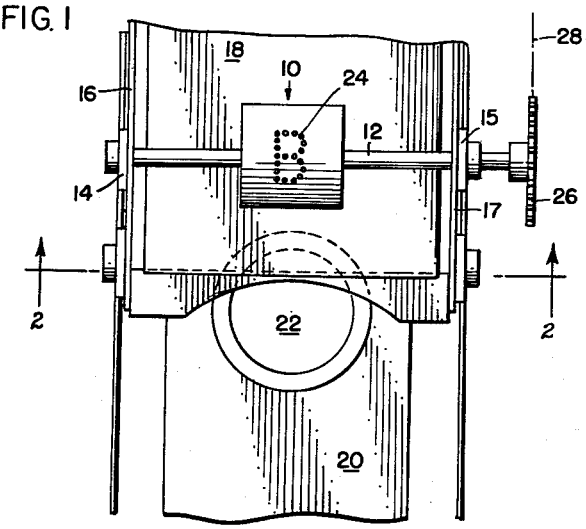
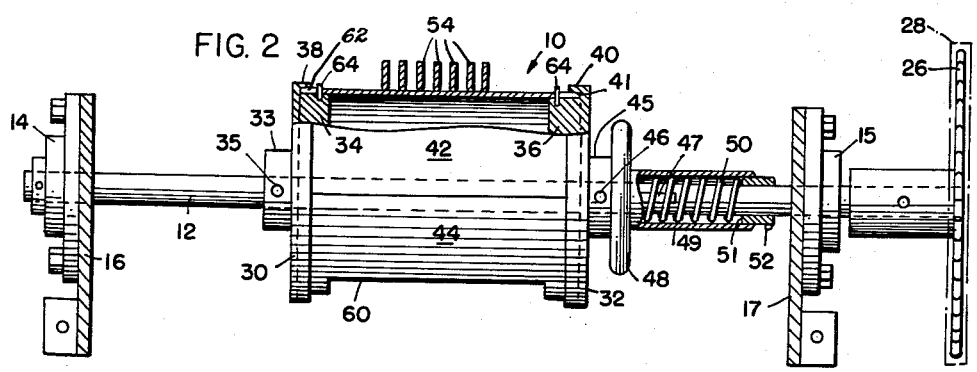
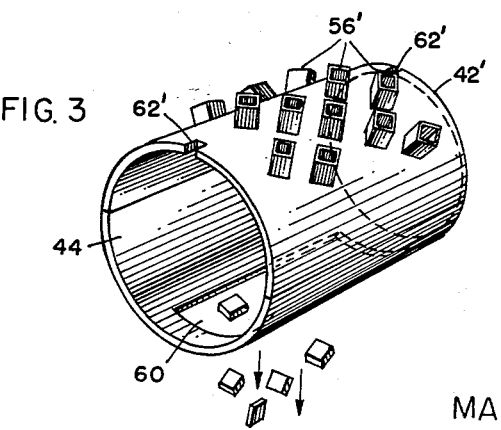
INVENTOR:
MARION C. JAHN
BY
ATT'YS

United States Patent Office 3,171,315
Patented Mar. 2, 1965

3,171,315
PIE CRUST MARKER
Marion C. Jahn, Highland Park, Ill., assignor to Colborne Manufacturing Company, Chicago, Ill., a corporation of Illinois
Original application Aug. 3, 1959, Ser. No. 831,165, now Patent No. 3,129,674, dated Apr. 21, 1964. Divided and this application Mar. 6, 1964, Ser. No. 350,035
6 Claims. (Cl. 83—331)

This is a division of application Serial No. 831,165, filed August 3, 1959, now Patent No. 3,129,674.

This invention concerns pie marking devices and particularly automatically operable rotary marking apparatus adapted for incorporation into automatic pie machines wherein dough pieces are sheeted to circular shape for the upper crust of a pie and then transferred automatically onto the filled pie plates.

In many cases it is desirable to mark the upper crust of a pie with an appropriate indication of the kind of filling contained in the pie and in other cases, where marking is not required, it is often desired to slit or perforate the top sheet or cover of the pie to allow the steam and excess juices to emerge during baking or to provide a lattice-like appearance for the top crust. For this purpose the dough sheet for the top or crust is preferably perforated or slit before it is deposited onto the filled pie plate and in an automatic pie machine this cutting or perforating operation would best be done by rotary means acting on the sheeted dough as it leaves the finishing rolls and while being transported for deposit onto the pie plate.

Also, it is extremely desirable that the marking or slitting device be capable of being quickly and easily changed from one marking to another when pies with different types of fillings are being made.

Therefore, the main objects of this invention are to provide an improved pie crust marking device particularly adaptable for continuous operation in an automatic pie machine; to provide such a device wherein the marking dies can be quickly and easily changed or replaced; to provide such a device wherein the marking means can be removed and replaced without dismantling the marking apparatus or disconnecting it from its drive; and to provide an improved automatic pie crust marking means of extremely simple and low cost construction.

Specific embodiments of this invention are shown in the accompanying drawing in which:

FIGURE 1 is a fragmentary plan view showing the dough sheet delivery means of an automatic pie machine in its relation to the pie plate conveyor thereof and illustrating the disposition of the improved pie crust marking means;

FIG. 2 is a front elevational view of the improved marking device as seen from the plane of the line 2—2 of FIG. 1, the marker being shown with perforating pins; and FIG. 3 is a perspective view of the body shell of the marking device showing an arrangement of die means as may be used to form a lattice-type top crust or cover for a pie.

In the operation of an automatic pie machine, as described in my above mentioned application, a dough-block or dough-ball is cross-rolled in a suitable sheeting means to form a circular sheet or disc of a size somewhat larger in diameter than the pie plate onto which it is to be deposited to cover a pre-formed pie. This disc of pie dough is then delivered from the finishing rolls of the sheeter onto a delivery conveyor positioned above the plate conveyor of the pie making machine and traveling at the same speed as the said plate conveyor. The plate conveyor comprises a continuous series of plate holders arranged lengthwise of the conveyor on equal, predetermined, centers and therefore, the sheeting means is arranged to produce and deliver the circular discs of sheeted dough onto the delievery conveyor in flat co-planar relation therewith and at a frequency rate equal to the number of plate holders passing the discharge end of the conveyor and in precisely timed relation therewith.

As illustrated in the drawings the improved pie crust marker comprises a hollow cylinder 10 mounted on a drive shaft 12 which is journaled in bearings 14 and 15 attached to the side plates 16 and 17 of the frame of a sheeter means, not shown, which supplies dough sheets of appropriate size onto an endless belt-type delivery conveyor 18. The delivery conveyor 18 is mounted above the plate conveyor 20, which is preferably driven at a constant speed, and is arranged with the upper run of the belt traveling in the same direction as the plate conveyor and at a speed to deliver the dough-sheets, not shown, over the end of the conveyor at the same speed of forward travel as the plate holders 22.

The marker drum or cylinder 10 is mounted above the delivery conveyor belt 18, axially parallel with the top surface thereof, and carries radially projecting die elements or cutters 24 arranged in the pattern of the mark to be applied to the pie dough sheet. The shaft 12 is spaced above the delivery conveyor at such a distance that the die elements 24 firmly engage endwise against the surface of the belt 18, upon rotation of the drum 10, and the shaft 12 is driven by a sprocket 26 which in turn is driven by a chain 28, directly from the sheeter mechanism, at a speed such that the peripheral speed of the die elements will be the same as the lineal speed of the delivery conveyor.

As shown in FIG. 2 the marker drum 10 comprises a first end plate 30 and a second end plate 32 having annular body portions 34 and 36, respectively, of equal diameter and outer rim or flange-like radial portions, 38 and 40, respectively. The shell of the marker drum comprises a pair of cylindrically curved members 42 and 44 which are angular segments of an axially split hollow cylinder and which together form a complete hollow cylinder having an inside diameter substantially the same as the diameter of the end plate body portions. These shell members are mounted on the body portions of the end plates 30 and 32, between the rim or radial portions 38 and 40, to complete the drum structure. The rim portions 38 and 40 are rabbetted or otherwise grooved, as at 41 in FIG. 2, at the periphery of the respective body portions to receive and seat the end edges of the shell members 42 and 44 and thereby firmly secure the shell members onto the end plates.

In the arrangement shown the end plat 30 has a hub 33 which is, suitably locked to the shaft 12, as by the set screw 35, and the end plate 32 has a hub 45 which is slidably keyed to the shaft 12, for axial movement thereon, as by a radial pin 46 extending into an axially extending keyway groove 47 formed in the periphery of the shaft. Thus the two end plates are in driving connection with the shaft 12 and the end plate 32 is axially slidable along the shaft to permit insertion and removal of the body shell members 42 and 44.

To provide for manipulation of the end plate 32, and also to urge it axially toward the end plate 30 so as to hold the body shell members 42 and 44 in place, a hand wheel 48 is formed on the hub 45 and the said hub is provided with a sleeve extension 49 which houses a compression spring 50, surrounding the shaft 12 and bearing between the hub 45 and a collar 51 fixed onto the shaft 12 by a set screw 52. Preferably the collar 51 has a sliding fit into the sleeve 49 so that the spring 50 is fully enclosed when the parts of the marker are all in operative position.

The body shell of the marker is made in sections, 42 and 44, to permit quick and easy substitution of one die section for another without dismantling the marker shaft from its journals, and it will be understood that the sections may or may not be of equal size in the angular dimension. As shown, the sections 42 and 44 are semi-cylindrical and the section 42 is the member which carries the die elements or cutters 24 for acting on the dough sheet carried by the conveyor 18. In the form shown in FIG. 2 the die elements comprise a plurality of radially extending perforating pins 54, integral on the outer periphery of the shell section 42, arranged in the design or pattern of the mark to be made in the dough sheet. In the form shown in FIG. 3 the die elements are hollow, open-ended members 56 adapted to punch or cut out pieces of the pie dough sheet and in this case the passage through each of the die elements opens through the body shell to the interior of the marker drum for passage of the cut-out pieces of dough thereinto.

The opposite shell member 44 is provided with a relatively large open portion 60 diametrically opposed to the marking die elements so that when the cut-out type are used, as shown in FIG. 3, the cuttings which enter the drum or body of the marker can be dropped or discharged therefrom. The opening 60, as shown, extends almost from end to end of the shell member, and for at least a major part of its length, and has an angular width of at least 50°. Also, the opening 60, being diametrically opposite the die elements, will discharge or drop the cuttings between the dough sheets on the conveyor 18 so that when the cuttings are dropped off the end of the conveyor they will fall between the plate holders 22 of the pie machine conveyor 20.

Also, as shown, the die carrying shell member 42 is formed with axially extending slots 62 in each end for receiving a radial pin 64 projecting from the periphery of the respective end plate body portions 34 and 36. This engagement of the shell member 42 with the end plates 30 and 32 ensures against angular displacement of the die member during operation of the marking device so that once marking drum rotation is timed to the delivery of dough sheets onto the conveyor 18 it will remain so regardless of any change or substitution of die members.

When it is desired to change a die member 42, the hand wheel 48 is pulled in the outward direction, against the force of the spring 50, until the adjacent end of the die member 42 is clear of the rabbetted groove 41 in the end plate 32. Then the die member is lifted and pulled out of the groove in the end plate 30 and removed. The replacement die member is installed by inserting its far end partially into the groove of the end plate 30, with its slot 62 engaged on the pin 64, and then resting the near end of the die member on the body portion of the end plate 32, and releasing the hand wheel 48. The force of the spring 50 will now seat the ends of the die member firmly in the respective grooves 41 of the end plates and the marker is ready for operation.

The main advantages of this invention reside in the simple construction of the marker and the ease with which the marking dies can be changed or replaced. Other advantages are to be found in the arrangement wherein cylindrically shaped die members can be removed or installed without in any way disturbing the support means and journals of the marker device; and in the construction whereby marking dies can be changed at any time without change of or interference with the timing of the operation of the marking device.

Although specific embodiments of this invention have been herein shown and described it will be understood that details of the construction shown may be altered or omitted without departing from the spirit of the invention as defined by the following claims.

I claim:

1. A sheeted pie-dough marking device comprising a conveyor for receiving a dough sheet in co-planar relation therewith, a marker drum mounted for rotation on a shaft extending transversely of the conveyor and parallel with the surface thereof, and means for rotating said shaft and marker drum in timed relation wtih said conveyor, said marker drum comprising a first end plate fixed on said shaft, a second end plate slidable axially on said shaft and keyed for rotation therewith, resilient means normally urging said second end plate axially toward the first end plate, a cylindrically curved body shell extending between said end plates concentrically therewith, means on said end plates axially engaging said body shell to releasably hold the shell between said plates, and radially projecting die elements on said body shell disposed to engage the surface of said conveyor.

2. The dough sheet marking device defined by claim 1 wherein means are provided on said end plates to hold the body shell against angular movement relative to the end plates.

3. The dough sheet marking device defined by claim 1 wherein the body shell comprises the angular segments of an axially split cylinder.

4. The dough sheet marking device defined by claim 1 wherein the means for holding the body shell comprises a concentrically curved recess formed in each of the mutually facing surfaces of said end plates, said recesses being radially dimensioned to receive said body shell endwise with a sliding fit, and said body shell being seated in said recesses.

5. The dough sheet marking device defined by claim 4 wherein the body shell comprises a pair of members which together form a hollow cylinder, the said recesses are annularly continuous, and the die elements are disposed on one of the said shell members.

6. The dough sheet marking device defined by claim 5 wherein the other of said shell members has an opening therein extending for a major part of the shell member length, and said opening has an angular width of at least 50 degrees.

References Cited by the Examiner

UNITED STATES PATENTS

| 1,485,782 | 3/24 | Fischer | 83—670 |
| 2,405,661 | 8/46 | MacManus | 107—1.5 X |
| 2,618,852 | 11/52 | Clough | 107—47 X |
| 2,915,823 | 12/59 | Wohlfeil | 30—306 |

ROBERT E. PULFREY, *Primary Examiner.*